(12) United States Patent
Barrass et al.

(10) Patent No.: US 9,385,929 B2
(45) Date of Patent: Jul. 5, 2016

(54) METHODS AND DEVICES FOR PERFORMING DYNAMIC DROOP COMPENSATION

(71) Applicant: Cisco Technology, Inc., San Jose, CA (US)

(72) Inventors: Hugh Barrass, Milpitas, CA (US);
Roger Antoine Karam, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 493 days.

(21) Appl. No.: 13/777,070

(22) Filed: Feb. 26, 2013

(65) Prior Publication Data

US 2014/0241181 A1     Aug. 28, 2014

(51) Int. Cl.
*H04B 3/00*     (2006.01)
*H04L 12/26*     (2006.01)
*H04L 12/12*     (2006.01)

(52) U.S. Cl.
CPC ................ *H04L 43/08* (2013.01); *H04L 12/12* (2013.01); *Y02B 60/34* (2013.01)

(58) Field of Classification Search
CPC ....................................................... H04L 43/08
USPC .......................................................... 375/258
See application file for complete search history.

(56) References Cited

U.S. PATENT DOCUMENTS

| | | | | |
|---|---|---|---|---|
| 3,796,965 | A * | 3/1974 | Quesinberry et al. | 330/43 |
| 6,529,387 | B2 * | 3/2003 | Kirbie | 363/16 |
| 6,940,973 | B1 * | 9/2005 | Yeap et al. | 379/416 |
| 7,457,252 | B2 | 11/2008 | Karam et al. | |
| 7,577,104 | B2 * | 8/2009 | Karam et al. | 370/252 |
| 2013/0339765 | A1 * | 12/2013 | Diab | 713/300 |

* cited by examiner

*Primary Examiner* — Lihong Yu
(74) *Attorney, Agent, or Firm* — Meunier Carlin & Curfman LLC

(57) ABSTRACT

Provided herein are systems, methods and devices for performing droop compensation. In particular, systems, methods and devices for performing droop compensation by modifying transmit and/or receive characteristics of a magnetic device based on changing conditions are described. For example, a plurality of operating parameters or characteristics can be measured, a droop compensation capability of a link partner can be determined and transmit and/or receive characteristics of the magnetic device can be modified based on the measured operating parameters or characteristics and the determined droop compensation capability.

20 Claims, 11 Drawing Sheets

METHODS AND DEVICES FOR PERFORMING DYNAMIC DROOP COMPENSATION

BACKGROUND

It is possible to supply electrical power over a wired telecommunications network such as the Ethernet, for example, from power sourcing equipment (PSE) to a powered device (PD) over a communication link. IP telephones, wireless LAN access points, Bluetooth access points, web cameras, digital still and video cameras, computers, tablets, liquid crystal displays, point-of-sale kiosks, network intercom systems, cellular telephones, security systems, gaming systems, etc. are examples of a PD. This technology is known as Power over Ethernet (PoE). PoE is defined in IEEE standard 802.3-2012 which provides the standard for combining transmission/reception of Ethernet packets (e.g., a communication signal) with transmission/reception of DC power over an Ethernet cable. According to the PoE standard, electrical power can either be injected by an endpoint PSE at one end of a link section or by a midspan PSE at a point along the link section in between network interfaces communicatively connected at opposite ends of the link section. A number of PoE implementations are discussed below.

Referring now to FIGS. 1A-1D, example block diagrams of systems for supplying electrical power in a PoE environment are shown. Particularly, in FIGS. 1A-1C, systems for supplying electrical power in variations where communication is enabled on two of the four twisted pairs (e.g., 10BASE-T, 100BASE-TX). In FIGS. 1A and 1B, electrical power is injected by an endpoint PSE, and in FIG. 1C, electrical power is injected by a midpoint PSE.

For example, as shown in FIGS. 1A and 1B, a network element 102 such as a switch, hub, router, gateway, etc., for example, is communicatively connected with a PD 108 through a communication link 120 (i.e., an Ethernet cable). The communication link 120 includes four twisted pairs 122A-122D. The network element 102 includes an integral PSE 104. In FIG. 1A, electrical power is injected by the PSE 104 onto two data-carrying twisted pairs 122A, 122B through center-tapped transformers 106A, 106B and is conducted from center-tapped transformers 112A, 112B for use by a load 110 of the PD 108. In FIG. 1A, the two non-data-carrying twisted pairs 122C, 122D are not used for communication or power transfer. In FIG. 1B, electrical power is injected by the PSE 104 onto the two non-data-carrying twisted pairs 122C, 122D and is conducted for use by the load 110 of the PD 108. In FIG. 1B, the two data-carrying twisted pairs 122A, 122B are not used for power transfer.

Referring now to FIG. 1C, an example block diagram of a system for supplying electrical power by a midspan PSE is shown. Similarly to FIGS. 1A and 1B, the network element 102 is communicatively connected with the PD 108 through the communication link 120. However, unlike FIGS. 1A and 1B, the network element 102 does not include an integral PSE 104. Instead, a midspan device 104A passes communication signals on the two data-carrying twisted pairs 122A, 122B, and the PSE 104 injects electrical power onto the two non-data-carrying twisted pairs 122C, 122D. The electrical power is conducted for use by the load 110 of the PD 108.

Referring now to FIG. 1D, an example block diagram of a system for supplying electrical power in variations where communication is enabled on four twisted pairs (e.g., 1000BASE-T, 10GBASE-T). Unlike FIGS. 1A-1C, twisted pairs 122A-122D are all data-carrying twisted pairs. It should be understood that electrical power can be supplied over two or four twisted pairs. For example, in some variations, electrical power can be injected by the PSE 104 onto two data-carrying twisted pairs 122A, 122B through center-tapped transformers 106A, 106B and conducted from center-tapped transformers 112A, 112B for use by the load 110 of the PD 108. Alternatively, electrical power can be injected by the PSE 104 onto two data-carrying twisted pairs 122C, 122D through center-tapped transformers 106C, 106D and conducted from center-tapped transformers 112C, 112D for use by the load 110 of the PD 108. It should also be understood that electrical power can be injected by the PSE 104 simultaneously onto two data-carrying twisted pairs 122A, 122B and two data-carrying twisted pairs 122C, 122D, respectively, to supply electrical power to two different loads. In addition, it should also be understood that electrical power can be injected by the PSE 104 simultaneously onto two data-carrying twisted pairs 122A, 122B and two data-carrying twisted pairs 122C, 122D, respectively, to supply electrical power to the load 110 of the PD 108. One of ordinary skill in the art would understand that the load 110 can accept power from a pair of diode bridge circuits such as full wave diode bridge type rectifier circuits depending on whether electrical power is supplied over data-carrying twisted pairs 122A, 122B, data-carrying twisted pairs 122C, 122D or data-carrying twisted pairs 122A, 122B and 122C, 122D. The diode bridge circuits can be part of a power reception circuit, for example.

Line coupling transformers (e.g., transformers 106A-106D and 112A-112D in FIGS. 1A-1D) in an Ethernet interface such as the network element 102 in FIGS. 1A-1D can act as high pass filters. The effect of a high pass filter is often referred to as "droop" because a steady voltage supplied to/received at a line coupling transformer is seen to droop according to the severity of the high pass filter. For example, differences in current flowing through each of the conductors in a twisted pair such as one of twisted pairs 122A-122D in FIGS. 1A-1D, for example, can cause saturation in a center-tapped magnetic device such as a line coupling transformer. If non-equal currents flow toward the center tap of the transformer from either side, the transformer core sees a non-zero current. A sufficiently larger non-zero current degrades the transformer characteristics, which causes droop. This problem can be more pronounced in PoE systems due to the large currents flowing through the transformer, which cause the magnetic core to become saturated and lower the effective inductance. Additionally, even if equal currents (i.e., electrically balanced currents) flow through each conductor of the twisted pair, imperfections during the transformer manufacturing process such as imperfections in the transformer windings, for example, can cause droop. As a result, communication signals that pass through the transformer are distorted.

In addition to current imbalances and manufacturing imperfections, the reduction in open circuit inductance (OCL) of line coupling transformers results in increasing droop. This increase in droop is present independent of the increase caused by current imbalances and/or manufacturing imperfections. While the specified minimum OCL should have theoretically increased to deal with current imbalances in PoE systems, the specified minimum OCL has decreased. For example, the standards for 100BASE-TX Ethernet specified an effective minimum OCL of 350 µH, and many legacy devices complying with the 100BASE-TX Ethernet standards were designed with OCLs up to 700 µH. However, the industry has recently lowered the effective minimum OCL specification for 10/100/1000BASE-T Ethernet to 120 µH. As a result, an Ethernet link can have a transformer with an OCL of 120 µH on one side and a transformer with an OCL of up to 700 µH on the other side. Further, the standards for 10GBASE-T Ethernet specify an effective minimum OCL of 100 μH (and an effective maximum OCL of 160 μH). Additionally, devices complying with the 10GBASE-T Ethernet standards can be designed to be backward compatible with 100/1000BASE-T Ethernet standards using the same transformer. Therefore, there is a risk of Ethernet link degradation due to the lowering of the effective minimum OCL specification.

Referring now to FIG. 2, a graph illustrating example results of droop tests performed on a plurality of Ethernet links is shown. The droop tests were performed according to 1000BASE-T Ethernet standards using standard measurement bench equipment and fixtures. Standard tests have traditionally proven that when the amount of droop is within acceptable limits (i.e., a specified range), a receiver can be designed to recover the communication signal without error. However, FIG. 2 illustrates degradation of Ethernet links caused by lowering of the effective minimum OCL specification. Measured response curve 202 illustrates a distorted communication signal on an Ethernet link between link partners having transformers with OCLs of greater than 350 μH. The amount of droop in curve 202 is within the specified range, and therefore, a receiver is expected to recover the communication signal without error. Measured response curve 204 illustrates a distorted communication signal on an Ethernet link between link partners having transformers with OCLs of greater than 350 μH and 140 μH, respectively. The amount of droop in curve 204 is at the margin of the specified range, and therefore, a receiver may not be capable of recovering the communication signal without error. Measured response curve 206 illustrates a distorted communication signal on an Ethernet link between link partners having transformers with OCLs of 140 μH. The amount of droop in curve 206 is below the specified range, and therefore, a receiver is not expected to recover the communication signal without error.

In some cases, particularly for higher speed Ethernet interfaces such as 1G and 10G links, the link undergoes a training sequence that allows the receiver to adapt the characteristics of the link, which includes compensating for the droop caused by the transformers, by modifying adaptive filters, for example. However, as system parameters change, the adaptive filters modified during the training sequence can become obsolete. For example, as discussed above, transformer characteristics change as the amount of current flowing through the transformer increases or decreases. This becomes particularly important in energy efficient PoE systems where the amount of PoE current can rapidly change over short periods of time.

SUMMARY

Provided herein are systems, methods and devices for performing droop compensation. In particular, systems, methods and devices for performing droop compensation by modifying transmit and/or receive characteristics of a magnetic device based on system conditions and a link partner's droop compensation capability are described. For example, a plurality of operating parameters or characteristics can be measured, the link partner's droop compensation capability can be determined and transmit and/or receive characteristics can be modified based on the measured operating parameters or characteristics and the determined droop compensation capability.

An example method for performing droop compensation a network device is provided below. The network device can include a magnetic device and an interface for receiving a pair of conductors. In addition, the magnetic device can have a primary winding and a secondary winding, and the pair of conductors can be coupled to the secondary winding of the magnetic device. Further, the pair of conductors can be configured to carry a communication signal. The example method can include measuring a plurality of operating parameters, determining a droop compensation capability of a link partner and adjusting at least one of a transmit characteristic and a receive characteristic of the magnetic device based on the measured operating parameters and the determined droop compensation capability. The plurality of operating parameters can include at least one operating parameter that has an effect on an OCL of the magnetic device.

Additionally, the method can include determining a droop compensation capability of a link partner by determining whether the link partner is capable of adjusting at least one of a transmit characteristic and a receive characteristic of the link partner's magnetic device. Optionally, this can include determining how the link partner is capable adjusting the at least one of a transmit characteristic and a receive characteristic (e.g., adaptive adjustment, static adjustment, analog adjustment, digital adjustment, etc.).

For example, the plurality of operating parameters can include an effective current imbalance in the pair of conductors. Optionally, the pair of conductors can be configured to carry a common mode voltage signal. Additionally, the plurality of operating parameters can further include any other operating parameter that has an effect on the OCL of the magnetic device including, but not limited to, a temperature, a current of the common mode voltage signal or a pulse power of the common mode voltage signal.

In some implementations, the transmit characteristic and/or the receive characteristic of the magnetic device can be adjusted by an analog means. For example, a direct current bias can be injected to the magnetic device to compensate for a change in the measured operating parameters.

In other implementations, the transmit characteristic and/or the receive characteristic of the magnetic device can be adjusted by a digital means. For example, the transmit characteristic or the receive characteristic can be adjusted by adjusting an adaptive filter to compensate for a change in the measured operating parameters.

Alternatively or additionally, the transmit characteristic can be adjusted by applying a pre-distorted communication signal to the primary winding of the magnetic device. A pre-distortion characteristic of the pre-distorted communication signal can compensate for a change in the measured operating parameters.

Optionally, at least one of a transmit characteristic and a receive characteristic of the magnetic device can be adjusted by selecting at least one of a predetermined transmit characteristic and receive characteristic based on the measured operating parameters. For example, the network device can be categorized under a plurality of operating conditions including various combinations of balanced and imbalanced PoE currents (i.e., currents carried by the pair of conductors), temperatures and link partner front-end configurations. The corresponding transmit and/or receive characteristics for each of the plurality of operating conditions can be stored in memory. Thus, a predetermined transmit and/or receive characteristic can be selected from the memory based on the measured operating parameters.

The transmit characteristic and/or the receive characteristic of the magnetic device can optionally be adaptively adjusted in response to a change in the measured operating parameters. In other words, the transmit characteristic and/or the receive characteristic of the magnetic device can be dynamically updated (i.e., in real time) in response to changing conditions. In this case, the droop compensation can be continuously adapted or automatically corrected as changing conditions are presented. Alternatively, the transmit characteristic and/or the receive characteristic of the magnetic device can optionally be adjusted at a fixed time. In other words, the adjustment to the transmit characteristic and/or the receive characteristic of the magnetic device can be static. The transmit characteristic and/or the receive characteristic of the magnetic device can be adjusted in response to an auto-negotiation process, a detected event or a scheduled event. For example, the detected event or the scheduled event can be transmission of data after a PD is turned on, receipt of a power change requirement from the PSE or PD, loss of the communication link, occurrence of transmission/reception errors, a programmed time, etc.

The example method can also include steps for exchanging droop compensation capabilities with a link partner. For example, the method can include establishing a communication link with a link partner, and exchanging droop compensation capabilities with the link partner. The droop compensation capabilities can be mechanisms for adjusting at least one of a transmit characteristic and a receive characteristic of the magnetic device such as whether the adjustment is static or adaptive; performed on transmit, receive or both magnetic devices; by analog or digital means; etc. Optionally, the droop compensation capabilities can be exchanged between link partners during an auto-negotiation process, for example. Additionally, the method can also include negotiating an order of performance of at least one of the droop compensation capabilities with the link partner. This disclosure contemplates that negotiating an order of performance includes not performing one or more of the droop compensation capabilities.

In addition, adjusting at least one of a transmit characteristic and a receive characteristic of the magnetic device based on the measured operating parameters can assist a link partner to the network device. For example, the link partner may be incapable of performing sufficient droop compensation. As discussed below, the network device can be an intelligent network device and can be configured to adjust its transmit and/or receive characteristics, which can help compensate for a link partner's inability to sufficiently compensate for droop at the link partner's receiver.

Alternatively or additionally, the method can include performing a droop compensation margin check. The margin check can include intentionally applying droop to evaluate the compensation that provides a small margin to the specification and detecting (or tracking) errors in the communication signals. Using the margin check, it is possible to identify the possibility that droop compensation will provide insufficient protection against errors on the link.

A network device that is configured to perform the methods discussed above can also be provided. For example, a network device can include a magnetic device having a primary winding and a secondary winding and an interface for receiving a pair of conductors. The pair of conductors can be coupled to the secondary winding of the magnetic device, and the pair of conductors can also be configured to carry a communication signal. The network device can further include a sensing circuit configured to measure a plurality of operating parameters, and a circuit configured to determine a droop compensation capability of a link partner and to adjust at least one of a transmit characteristic and a receive characteristic of the magnetic device in response to a change in the operating parameters and the determined droop compensation of the link partner. As discussed above, the plurality of operating parameters can include at least one operating parameter that has an effect on an open circuit inductance (OCL) of the magnetic device.

Additionally, the circuit can be further configured to determine a droop compensation capability of a link partner by determining whether the link partner is capable of adjusting at least one of a transmit characteristic and a receive characteristic of the link partner's magnetic device. Optionally, this can include determining how the link partner is capable adjusting the at least one of a transmit characteristic and a receive characteristic (e.g., adaptive adjustment, static adjustment, analog adjustment, digital adjustment, etc.)

Additionally, the plurality of operating parameters can include an effective current imbalance in the pair of conductors. Optionally, the pair of conductors can be configured to carry a common mode voltage signal. Additionally, the plurality of operating parameters can further include any other operating parameter that has an effect on the OCL of the magnetic device including, but not limited to, a temperature, a current of the common mode voltage signal or a pulse power of the common mode voltage signal.

A physical layer device (PHY) that is configured to perform the methods discussed above can also be provided. A PHY can include a transmitter section having a transmitter digital signal processor (DSP) and a transmitter digital-to-analog converter (DAC). The transmitter DAC can be communicatively connected between the transmitter DSP and a transmission magnetic device having primary and secondary windings, and the transmitter DAC can be communicatively connected to the primary winding of the transmission magnetic device via a pair of transmitter conductors. The PHY can also include a receiver section having a receiver DSP and a receiver analog-to-digital (ADC). The receiver ADC can be communicatively connected between the receiver DSP and a receiver magnetic device having primary and secondary windings, and the receiver ADC can be communicatively connected to the primary winding of the receiver magnetic device via a pair of receiver conductors. In addition, the PHY can further include a memory. As discussed above, the pairs of transmitter and receiver conductors can be configured to carry a communication signal. The transmitter section or receiver section of the PHY can be configured to receive a plurality of measured operating parameters, determine a droop compensation capability of a link partner, update the memory with the measured operating parameters and the determined droop compensation capability, and adjust at least one of a transmit characteristic and a receive characteristic based on the measured operating parameters and the determined droop compensation capability.

Additionally, the plurality of operating parameters can include an effective current imbalance in the pair of transmitter conductors or the pair of receiver conductors. Optionally, the pair of conductors can be configured to carry a common mode voltage signal. Additionally, the plurality of operating parameters can further include any other operating parameter that has an effect on the OCL of the transmission or receiver magnetic device including, but not limited to, a temperature, a current of the common mode voltage signal or a pulse power of the common mode voltage signal.

It should be understood that the above-described subject matter can be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1A:
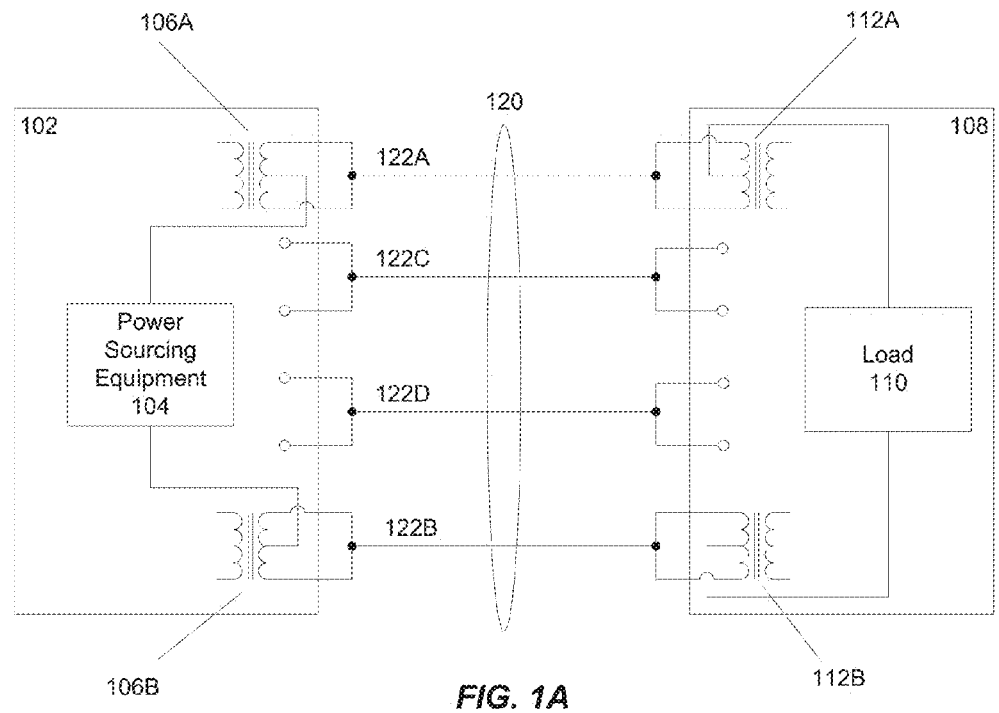
FIGS. 1A-1D illustrates example block diagrams of systems for supplying electrical power in a PoE environment.
Figure 1B:
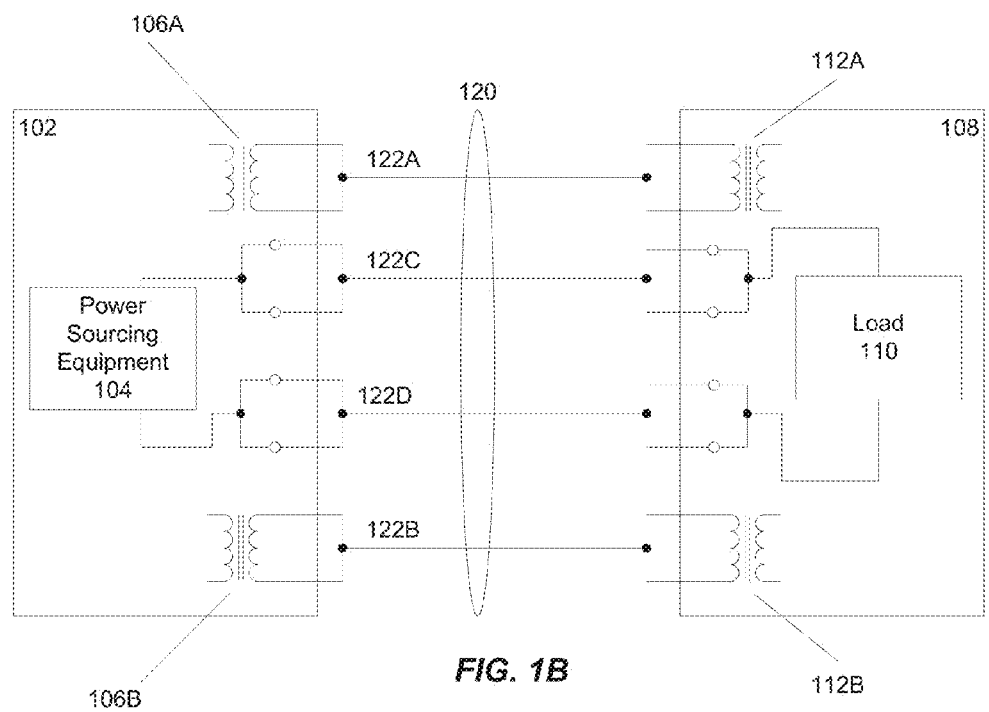
Figure 1C:
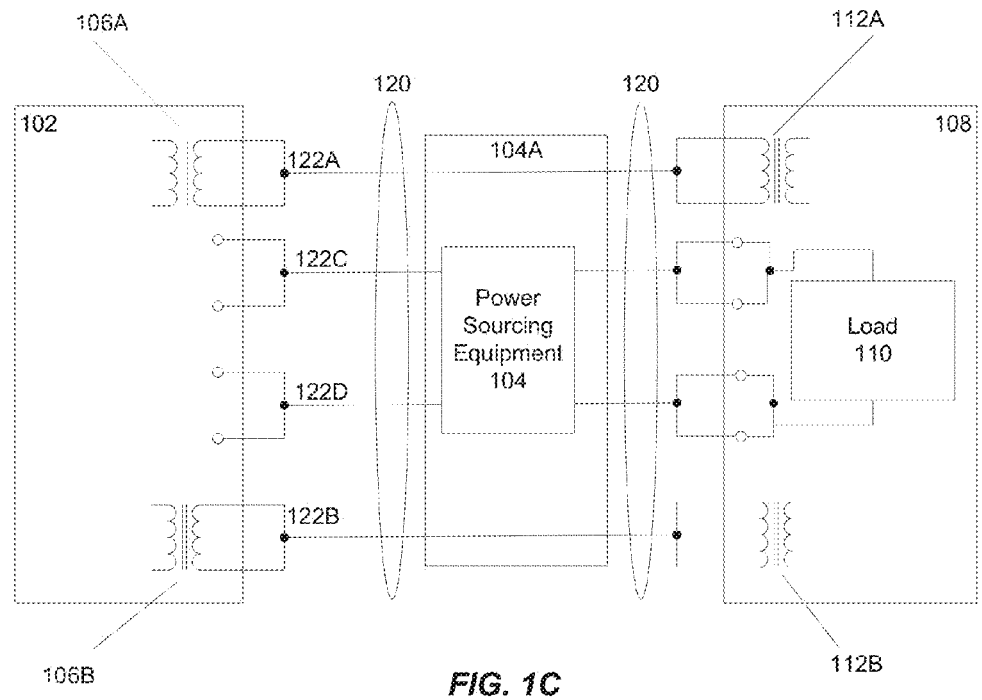
Figure 1D:
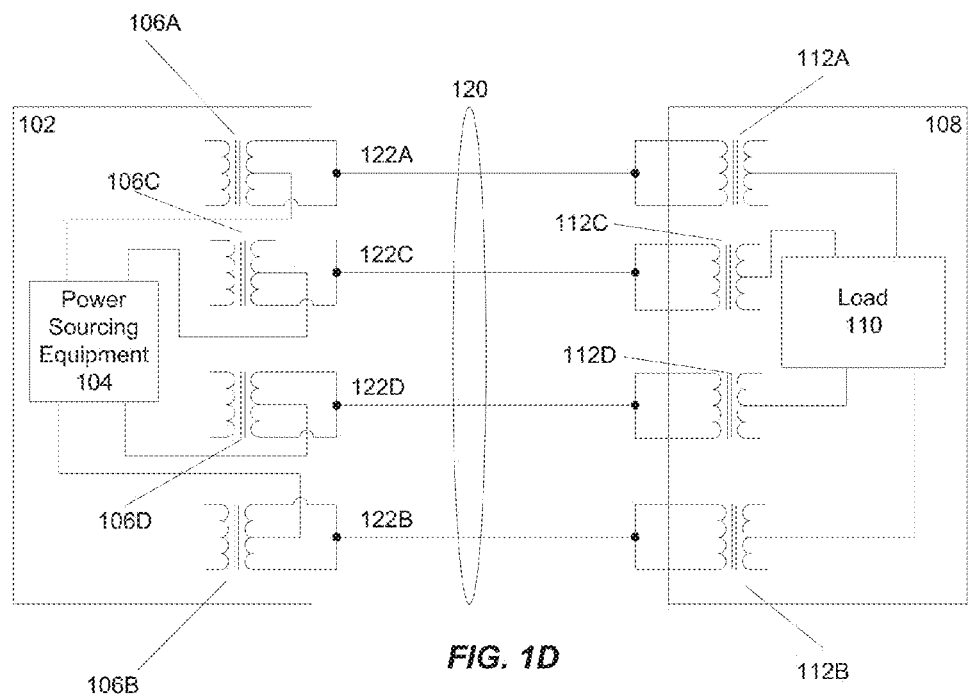

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a", "an", "the", include plural referents unless the context clearly dictates otherwise. The term "comprising" and variations thereof as used herein is used synonymously with the term "including" and variations thereof and are open, non-limiting terms. While implementations will be described for performing droop compensation by modifying at least one of a transmit characteristic and a receive characteristic of a magnetic device, it will become evident to those skilled in the art that the implementations are not limited thereto. Examples are provided herein where droop compensation is performed in PoE environments, where transmission and reception of differential communication signals is combined with transmission and reception of electrical power over a communication link. It should be understood, however, that droop compensation can also be performed in non-PoE environments, e.g., systems configured for transmission and reception of differential communication signals without transmitting and receiving electrical power over the communication link. For example, non-PoE environments includes a switch-to-switch connection that facilitates only transmission of differential communication signals. Additionally, it should be understood that droop compensation can be performed in PoE environments where PoE is a back-up power source. For example, back-up PoE environments include systems where a powered device (e.g., an IP telephone) is locally powered with PoE as a back-up source of electrical power.

Droop compensation can be performed according to implementations discussed herein by adjusting the transmit characteristic and/or the receive characteristic of a magnetic device. Adjusting the transmit characteristic and/or the receive characteristic of a magnetic device can be accomplished by analog and/or digital means. For example, droop compensation can be performed by adjusting the transmit characteristic and/or the receive characteristic of a magnetic device by analog means, digital means or both analog and digital means. Droop compensation can optionally be performed at one (e.g., transmitter magnetic device or receiver magnetic device) or both ends (e.g., transmitter magnetic device and receiver magnetic device) of a communication link. The transmit characteristic and/or the receive characteristic of a magnetic device can optionally be adjusted by injecting current into the magnetic device, for example. The transmit characteristic and/or the receive characteristic of a magnetic device can optionally be adjusted with analog and/or digital circuitry (e.g., the circuitry of a PHY). For example, the transmit characteristic of a magnetic device can optionally be adjusted by boosting amplitude of a transmitted communication signal (e.g., a pre-distorted signal). Alternatively or additionally, the receive characteristic of a magnetic device can be adjusted by offset nulling or using any other compensation circuitry. Alternatively or additionally, the transmit characteristic and/or the receive characteristic of a magnetic device can be adjusted by changing adaptive filter coefficients.

Figure 3A:
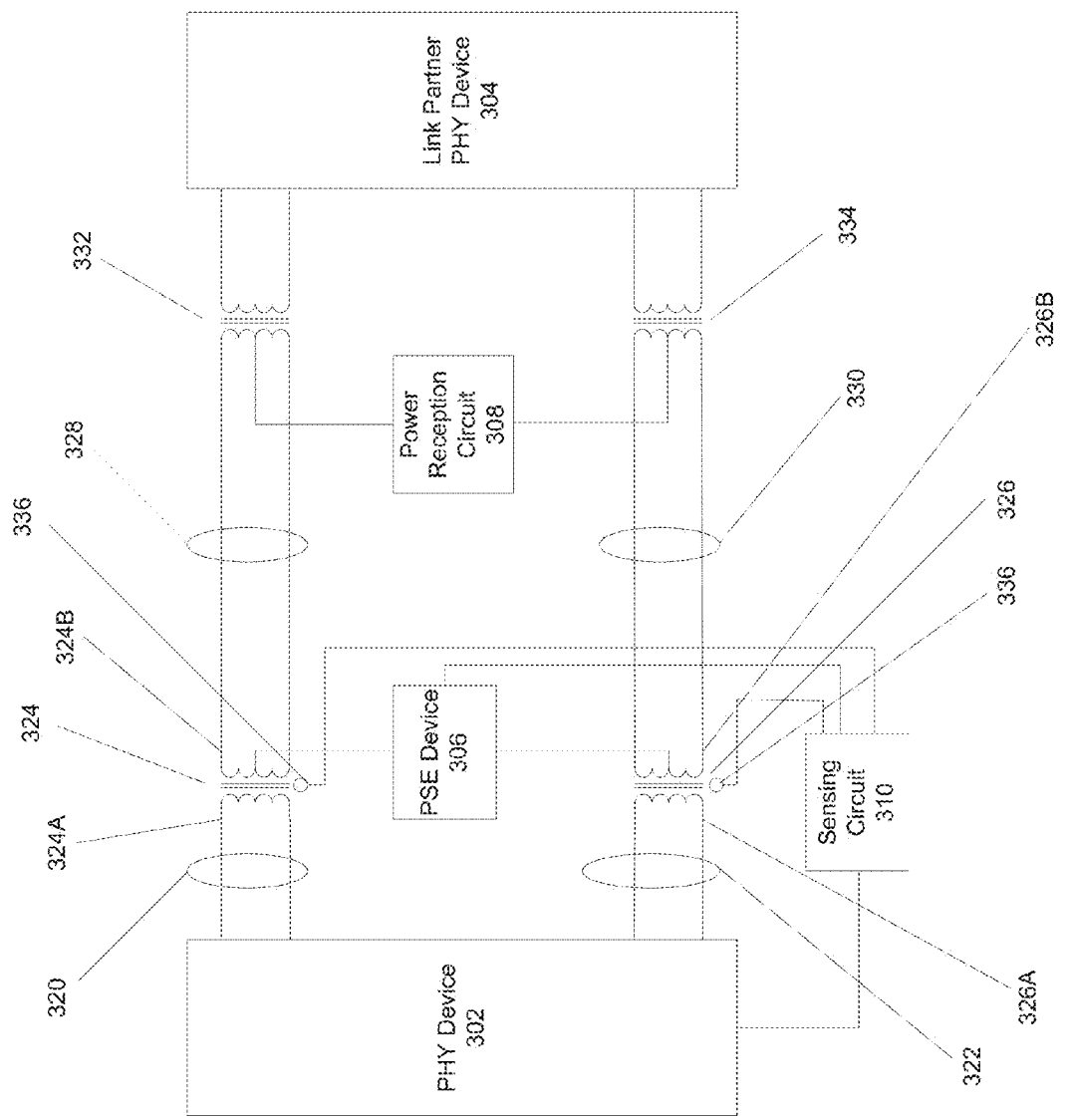
FIG. 3A is a block diagram illustrating an example circuit configuration for performing droop compensation according to implementations discussed herein.

FIG. 3A is a block diagram illustrating an example circuit configuration for performing droop compensation according to implementations discussed herein. It should be understood that the example circuit configuration shown in FIG. 3A can be used to combine transmission and reception of differential communication signals (e.g., Ethernet packets) with transmission and reception of electrical power (i.e., a common mode voltage signal) over a communication link (e.g., an Ethernet link) as discussed above. Although FIG. 3A illustrates two twisted pairs of conductors, this disclosure contemplates implementations using one or more twisted pairs of conductors including implementations using two or four pairs of twisted conductors as discussed above with regard to FIGS. 1A-1D. For example, this disclosure contemplates a circuit configuration for implementing 10BASE-T, 100BASE-TX, 1000BASE-T, 10GBASE-T, etc. Ethernet. Additionally, although droop compensation discussed below is performed by a PSE endpoint device (e.g., a switch, hub, router, gateway, etc.), this disclosure contemplates that droop compensation can be performed by a PD or a midspan device, if desired.

Figure 2:
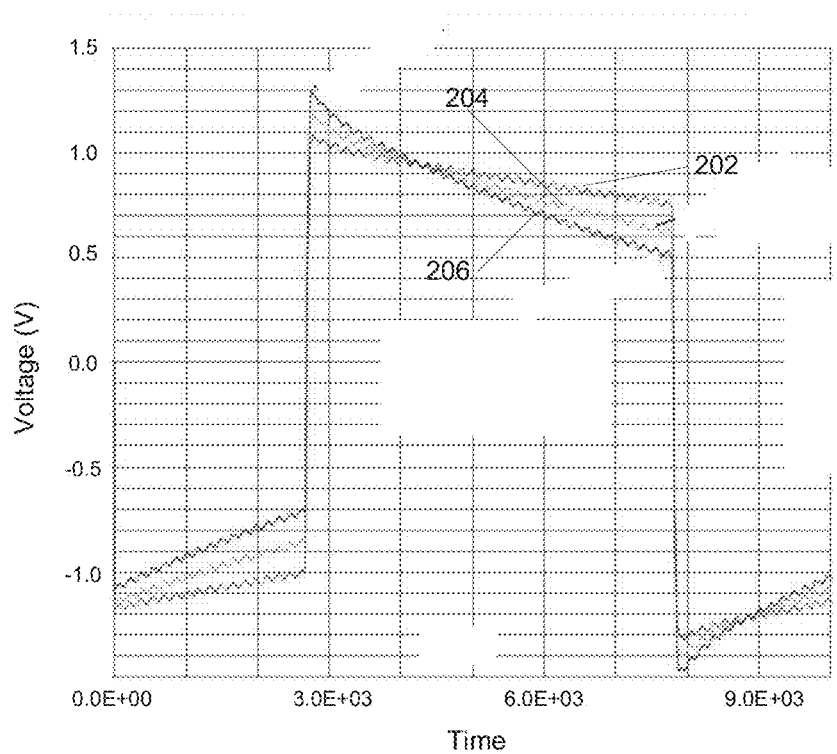
FIG. 2 is a graph illustrating example results of droop tests performed on a plurality of Ethernet links.

As shown in FIG. 3A, the example circuit configuration includes a PHY device 302, which is the hardware that implements the transmission and reception functions for sending and receiving the communication signal (i.e., Ethernet frames), having a transmit twisted pair (or differential pair, transmitter conductors, etc.) 320 and a receive twisted pair (or differential pair, receiver conductors, etc.) 322. Alternatively or additionally, the PHY 302 can optionally be configured for transmitting and receiving communication signals on the same twisted pair. For example, in 10BASE-T and 100BASE-TX configurations, transmission and reception may occur on separate twisted pairs, and in 1000BASE-T and 10GBASE-T configurations, transmission and reception may occur on the same twisted pair. The PHY device 302 can be included in a network device (e.g., a switch, hub, router, gateway, etc.), a PSE device, a PD or a midspan device, as discussed above. The transmit twisted pair 320 is communicatively connected to a transmission magnetic device 324 such as a center-tapped transformer, for example. The transmission magnetic device 324 can have a primary winding 324A and a secondary winding 324B. Additionally, the receive twisted pair 322 is communicatively connected to a receiver magnetic device 326 such as a center-tapped transformer, for example. The receiver magnetic device 326 can have a primary winding 326A and a secondary winding 326B. The PHY device 302 can also be configured to measure (or detect) the droop over time of the differential communication signals. For example, the PHY device 302 can be configured to measure voltage over time of the transmitted or received differential communication signals and detect a decrease in voltage over time such as the decrease in voltage manifested by the distorted communication signals shown by curves 202, 204 and 206 in FIG. 2.

As shown in FIG. 3A, a PSE device 306 is optionally communicatively connected to a center tap of the secondary windings 324B, 326B of the transmission magnetic device 324 and the receiver magnetic device 326, respectively. It should be understood that a center tap of the primary windings 324A, 326A of the transmission magnetic device 324 and the receiver magnetic device 326 can be connected to AC or DC ground, for example. The PSE device 306 can be configured to supply a common mode voltage signal (e.g., DC electric power). The common mode voltage signal can be conducted via the secondary windings 324B, 326B of the transmission magnetic device 324 and the receiver magnetic device 326, respectively, through twisted pairs 328, 330 to a receiver magnetic device 332 and a transmission magnetic device 334 of a link partner's PHY device 304. It should be understood that the twisted pairs 328, 330 can also carry the communication signal. For example, the twisted pairs 328, 330 can be included in a communication link such as an Ethernet cable. Similarly to above, the receiver magnetic device 332 can have a primary winding and a secondary winding, and the transmission magnetic device 334 can have a primary winding and a secondary winding. In addition, the common mode voltage signal can be delivered to a load through a power reception circuit 308. The power reception circuit 308 can optionally include diode bridge circuits or any other circuit to facilitate delivery of the common mode voltage signal to the load. As discussed above, it should be understood that the example circuit configuration for performing droop compensation can optionally be implemented without the PSE device 306 (i.e., non-PoE environments) or with the PSE device 306 providing a back-up source of electrical power (i.e., back-up PoE environments).

Additionally, the example circuit configuration can include a sensing circuit 310. The sensing circuit 310 can be configured to measure a plurality of operating parameters, for example. Optionally, the PHY device 302 can be configured to measure one or more of the plurality of operating parameters. The plurality of operating parameters can include at least one operating parameter that has an effect on an OCL of a magnetic device such as transmission and receiver magnetic devices 324, 326, for example, under DC and AC operating conditions. Although implementations are discussed below with regard to transmission or receiver magnetic devices 324, 326, this disclosure contemplates implementing droop compensation for any magnetic device including, but not limited to, any one of the magnetic devices 324, 326, 332, 334 shown in FIG. 3A. The plurality of operating parameters can include an effective current imbalance in the pair of conductors 328, 330. Methods and devices to detect an effective current imbalance are known in the art. For example, an effective current imbalance can be detected indirectly on a primary winding of a magnetic device such as the transmission or receiver magnetic devices 324, 326, for example, through PHY-based monitoring of the incoming or outgoing communication signals. Alternatively or additionally, an effective current imbalance can be directly detected on a secondary winding of the transmission or receiver magnetic devices 324, 326. Methods and devices for detecting an effective current imbalance are described, for example, in U.S. Pat. No. 7,457,252 issued Nov. 25, 2008 and entitled "CURRENT IMBALANCE COMPENSATION FOR MAGNETICS IN A WIRED DATA TELECOMMUNICATIONS NETWORK" to Karam et al., which is incorporated by reference herein in its entirety.

Additionally, the plurality of operating parameters can further include any other operating parameter that has an effect on the OCL of the magnetic devices 324, 326 including, but not limited to, a temperature, a current of the common mode voltage signal or a pulse power of the common mode voltage signal. The temperature can include an approximate temperature of a magnetic device such as transmission and receiver magnetic devices 324, 326, for example. The OCL of a magnetic device can drop by between 25% and 50% over the expected operating temperature range of the magnetic device depending on materials used to build the magnetic device. Additionally, in multi-port devices, the magnetic devices are housed inside of the connectors (e.g., an RJ-45 connectors, for example), and therefore, the temperature of the magnetic devices can be effected by supplying (or removing) DC power to (or from) adjacent ports. As shown in FIG. 3A, the sensing circuit 310 can receive inputs from temperature sensors 336, which detect an approximate temperature of the transmission and receiver magnetic devices 324, 326. This disclosure contemplates that the temperature can be any temperature that has an effect on the OCL of the magnetic devices 324, 326 including, but not limited to, an approximate temperature the magnetic devices 324, 326, a temperature of a PSE device, a temperature of a communication link, etc. In addition, as discussed above, the plurality of operating parameters can further include a current of the common mode voltage signal or a pulse power of the common mode voltage signal. Characteristics of a magnetic device change as the amount of current flowing through the magnetic device increases or decreases. In the PoE environment, the amount of PoE current, and therefore the current flowing through a magnetic device, can rapidly change over short periods of time, which is especially the case with regard to energy efficient PoE systems. Thus, as shown in FIG. 3A, the sensing circuit 310 can receive an input from the PSE device 306 and can be configured to measure a current of the common mode voltage signal or a pulse power of the common mode voltage signal supplied by the PSE device 306. Additionally, the plurality of operating parameters measured by the sensing circuit 310 can optionally be correlated with the droop over time measured by the PHY device 302.

In addition, the example circuit configuration can include a circuit for adjusting at least one of a transmit characteristic and a receive characteristic of a magnetic device such as the magnetic devices 324, 326 based on the measured operating parameters. Optionally, the example circuit configuration can include a circuit for adjusting the transmit characteristic of the magnetic device. Optionally, the example circuit configuration can include a circuit for adjusting the receive characteristic of the magnetic device. Optionally, the example circuit configuration can include a circuit for adjusting transmit and receive characteristics of the magnetic device. Alternatively or additionally, the circuit can be configured to determine a droop compensation capability of a link partner (e.g., ability of a link partner to perform static adjustment, adaptive adjustment, analog adjustment, digital adjustment, etc.). The circuit can optionally be configured to adjust the transmit and/or receive characteristics of the magnetic device based on the measured operating parameters and the determined droop compensation capability of the link partner. For example, "intelligent" devices (e.g., intelligent 1000BASE-T, 10GBASE-T or multi-speed Ethernet devices) can be configured to adjust transmit and/or receive characteristics on each of the twisted pairs. Intelligent devices can also be configured to communicate with link partners in order to negotiate adjustment capabilities, which are discussed in detail below. In addition, legacy devices (e.g., legacy 10BASE-T and 100BASE-TX Ethernet devices with or without PoE capabilities) may not be configured to adjust transmit and/or receive characteristics or be configured to communicate to negotiate adjustment capabilities. Thus, intelligent device can be configured to "help" legacy link partners by adjusting local transmit characteristics, which is especially beneficial when the legacy link partners are not capable of adjusting receive characteristics.

This disclosure contemplates that transmit and/or receive characteristics can be adjusted by analog or digital means. For example, transmit and/or receive characteristics can be adjusted by analog means by injecting a direct current bias to a magnetic device such as the transmission or receiver magnetic devices 324, 326, for example, to compensate for a change in the measured operating parameters. Injecting a direct current bias to a magnetic device can rebalance the magnetic device and compensate for droop. Methods and devices for adjusting transmit and/or receive characteristics of a magnetic device by analog means are described, for example, in U.S. Pat. No. 7,457,252 issued Nov. 25, 2008 and entitled "CURRENT IMBALANCE COMPENSATION FOR MAGNETICS IN A WIRED DATA TELECOMMUNICATIONS NETWORK" to Karam et al., which is incorporated by reference herein in its entirety. Alternatively or additionally, transmit and/or receive characteristics can be adjusted by adjusting circuitry of a PHY to compensate for droop. For example, the transmit characteristic can optionally be adjusted by boosting amplitude of the communication signal to compensate for droop. The receive characteristic can optionally be adjusted by offset nulling, for example.

Figure 3B:
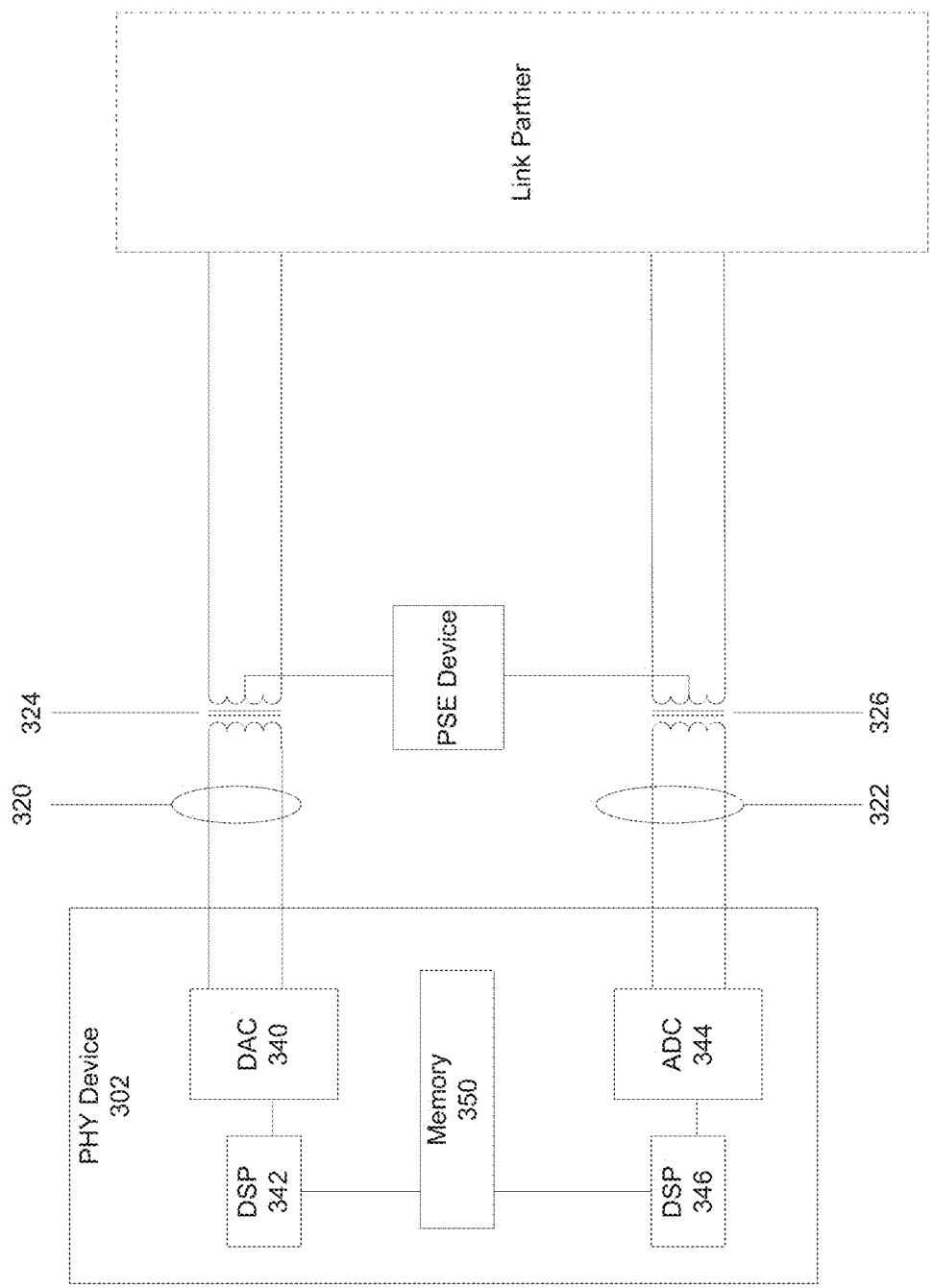
FIG. 3B is a block diagram illustrating a PHY device of the example circuit configuration shown in FIG. 3A.

Alternatively or additionally, the transmit characteristic and/or the receive characteristic of the magnetic devices 324, 326 can be adjusted by a digital means. For example, the transmit characteristic and/or the receive characteristic of the magnetic devices 324, 326 can be adjusted using the PHY device 302, which is discussed below with regard to FIG. 3B. The PHY device 302 can include a transmitter section having a transmitter digital signal processor (DSP) 342 and a transmitter digital-to-analog converter (DAC) 340. The transmitter DAC 340 can be communicatively connected between the transmitter DSP 342 and a transmission magnetic device 324 having primary and secondary windings. The transmitter DAC 340 can be communicatively connected to the primary winding of the transmission magnetic device 324 via a pair of transmitter conductors 320. The transmitter DAC 340 can convert a digital communication signal output by the transmitter DSP 342 into an analog differential communication signal for transmission on the pair of transmitter conductors 320. The transmitter DSP 342 can be configured to adjust one or more transmit characteristics of the transmission magnetic device 324 based on the measured operating parameters, for example.

The PHY device 302 can also include a receiver section having a receiver DSP 346 and a receiver analog-to-digital (ADC) 344. The receiver ADC 344 can be communicatively connected between the receiver DSP 346 and a receiver magnetic device 326 having primary and secondary windings. The receiver ADC 344 can be communicatively connected to the primary winding of the receiver magnetic device 326 via a pair of receiver conductors 322. The receiver ADC 344 can convert an analog differential communication signal received over the pair of receiver conductors 322 into a digital communication signal. The receiver DSP 346 can be configured to adjust one or more receive characteristics of the receiver magnetic device 326 based on the measured operating parameters, for example.

In addition, the PHY device 302 can further include a memory 350. The transmitter section or receiver section of the PHY device 302 can be configured to receive measured operating parameters, determine a droop compensation capability of a link partner, update the memory 350 with the measured operating parameters and the determined droop compensation capability, and adjust at least one of a transmit characteristic and a receive characteristic based on the measured operating parameters and the determined droop compensation capability. The memory 350 can be updated with the measured operating parameters in raw form, or alternative and as discussed below, a look up table can be used when adjusting the transmit and/or receive characteristics. In some implementations, the transmit characteristic and/or the receive characteristic of a magnetic device can be adjusted by adjusting adaptive filters. The transmitter DSP 342 and/or the receiver DSP 346 can be configured to modify an adaptive filter to compensate for a change in the measured operating parameters, for example, for example. Alternatively or additionally, the transmit characteristic can be adjusted by applying a pre-distorted communication signal to the primary winding of the magnetic device 324. A pre-distortion characteristic of the pre-distorted communication signal can compensate for a change in the measured operating parameters. The transmitter DSP 342 can be configured to generate the pre-distorted communication signal, for example.

Optionally, at least one of a transmit characteristic and a receive characteristic of the magnetic devices 324, 326 can be adjusted by selecting a predetermined transmit or receive characteristic based on the measured operating parameters. For example, a device such as a network device, PHY device, magnetic device, etc., for example, can be categorized under a plurality of operating conditions including various combinations of balanced and imbalanced PoE currents (i.e., currents carried by the pair of conductors), temperatures and link partner front-end configurations. The corresponding transmit and/or receive characteristics for each of the plurality of operating conditions can be stored in the memory 350, for example. Thus, a predetermined transmit or receive characteristic can be selected or retrieved from the memory 350 by the transmitter DSP 342 or receiver DSP 346, for example, based on the measured operating parameters.

The transmit characteristic and/or the receive characteristic of the magnetic devices 324, 326 can optionally be adaptively adjusted in response to a change in the measured operating parameters. In other words, the transmit characteristic and/or the receive characteristic of the magnetic devices 324, 326 can be dynamically updated (i.e., in real time) in response to changing conditions. For example, changing conditions can include, but are not limited to a change in temperature of the magnetic device, a change in PoE current or power, degradation of the communication signals (i.e., data corruption occurs), magnetic drift, etc. In this case, the droop compensation can be continuously adapted or automatically corrected as changing conditions are presented. Alternatively, the transmit characteristic and/or the receive characteristic of the magnetic devices 324, 326 can optionally be adjusted at a fixed time. In other words, the adjustment to the transmit characteristic and/or the receive characteristic of the magnetic devices 324, 326 can be static. The transmit characteristic and/or the receive characteristic of the magnetic devices 324, 326 can be adjusted in response to an auto-negotiation process, a detected event or a scheduled event. For example, the detected event or the scheduled event can be transmission of data after a PD is turned on, receipt of a power change requirement from the PSE or PD, loss of the communication link, occurrence of transmission/reception errors, a programmed time, etc.

Figure 3C:
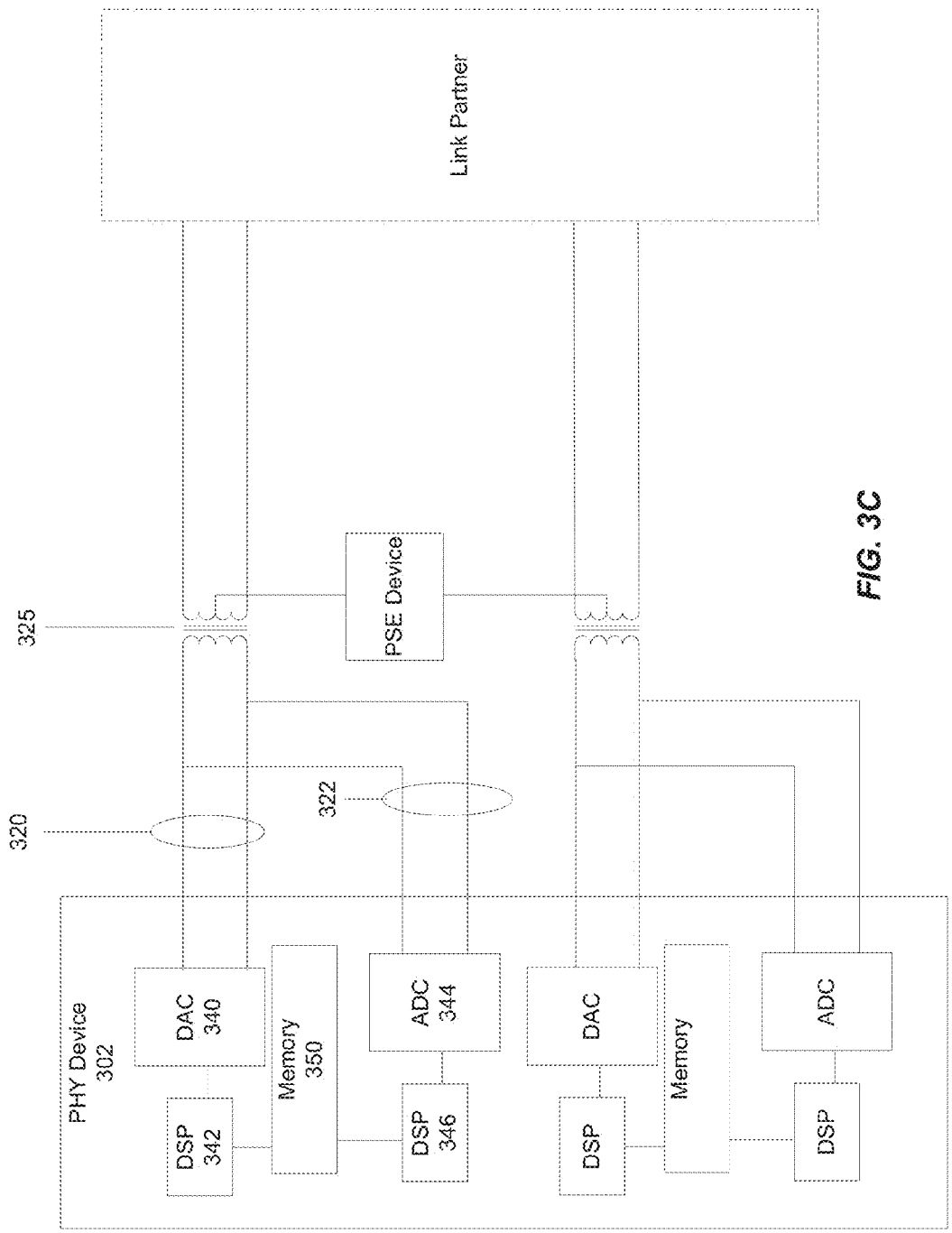
FIG. 3C is a block diagram illustrating another PHY device of the example circuit configuration shown in FIG. 3A.

Alternatively or additionally, the PHY 302 can optionally be configured for transmitting and receiving communication signals on the same twisted pair as discussed above. This is shown in FIG. 3C, for example. The PHY device 302 can include a transmitter section having a transmitter digital signal processor (DSP) 342 and a transmitter digital-to-analog converter (DAC) 340. The transmitter DAC 340 can be communicatively connected between the transmitter DSP 342 and a transmission/reception magnetic device 325 having primary and secondary windings. The transmitter DAC 340 can be communicatively connected to the primary winding of the transmission/reception magnetic device 325 via a pair of transmitter conductors 320. In addition, the PHY device 302 can also include a receiver section having a receiver DSP 346 and a receiver analog-to-digital (ADC) 344. The receiver ADC 344 can be communicatively connected between the receiver DSP 346 and the transmission/reception magnetic device 325. The receiver ADC 344 can be communicatively connected to the primary winding of the transmission/reception magnetic device 325 via a pair of receiver conductors 322. The PHY 302 can also include a memory 350.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 4A:
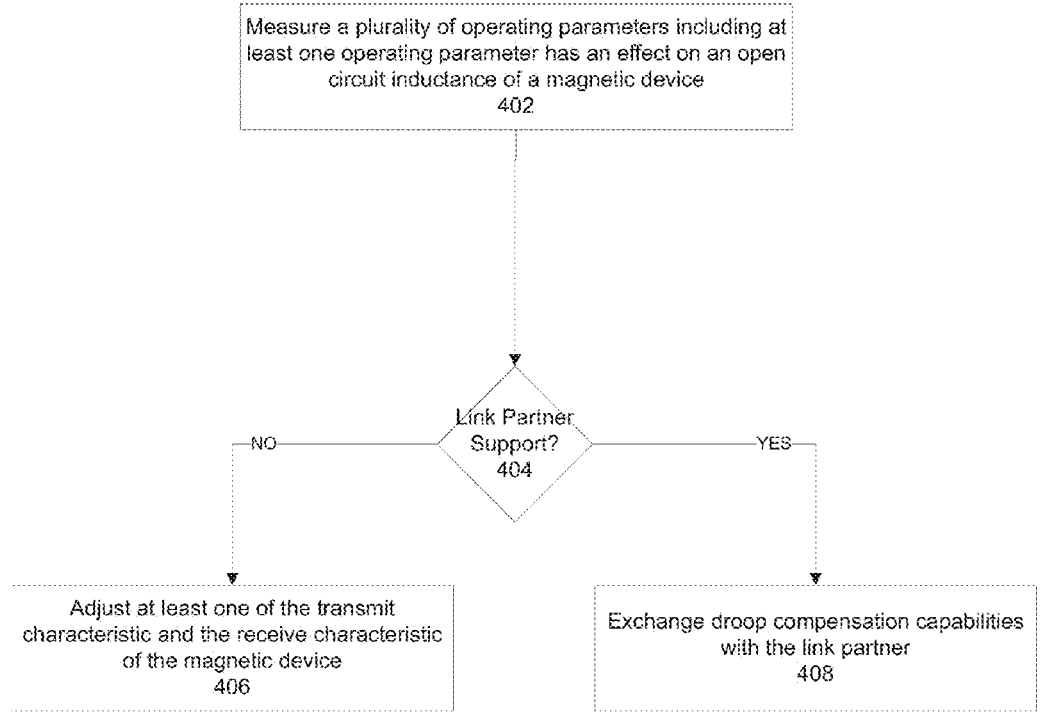
FIG. 4A is a flow diagram illustrating example operations for performing droop compensation according to implementations discussed herein.

Referring now to FIG. 4A, a flow diagram illustrating example operations for performing droop compensation is shown. At 402, a plurality of operating parameters can be measured. The plurality of operating parameters can include at least one operating parameter that has an effect on an OCL of the magnetic device under AC and DC operating conditions. For example, the plurality of operating parameters can include an effective current imbalance in the pair of conductors. Additionally, the plurality of operating parameters can further include any other operating parameter that has an effect on the OCL of the magnetic device including, but not limited to, a temperature, a current of the common mode voltage signal or a pulse power of the common mode voltage signal. Then, at 404, a determination is made as to whether the link partner is capable of performing droop compensation. As discussed above, this determination can include determining whether the link partner is capable of adjusting the transmit characteristic, the receive characteristic or both the transmit characteristic and the receive characteristic of the link partner's magnetic device. Additionally, this determination can optionally include determining the means (e.g., static, adaptive, analog, digital, etc.) by which the link partner can perform droop compensation. By determining the link partner's droop compensation capability, it is possible to locally adjust at least one of the transmit characteristic and the receive characteristic of the magnetic device to compensate for the link partner's inability to perform sufficient droop compensation. If NO, at 406, at least one of a transmit characteristic and a receive characteristic of the magnetic device can be adjusted based on the measured operating parameters and the determined droop compensation capability. If YES, at 408, droop compensation capabilities can be exchanged with a link partner. This is discussed below with regard to FIGS. 4B and 4C. Alternatively or additionally, if YES, at least one of a transmit characteristic and a receive characteristic of the magnetic device can be adjusted based on the measured operating parameters and the determined droop compensation capability.

Figure 4B:
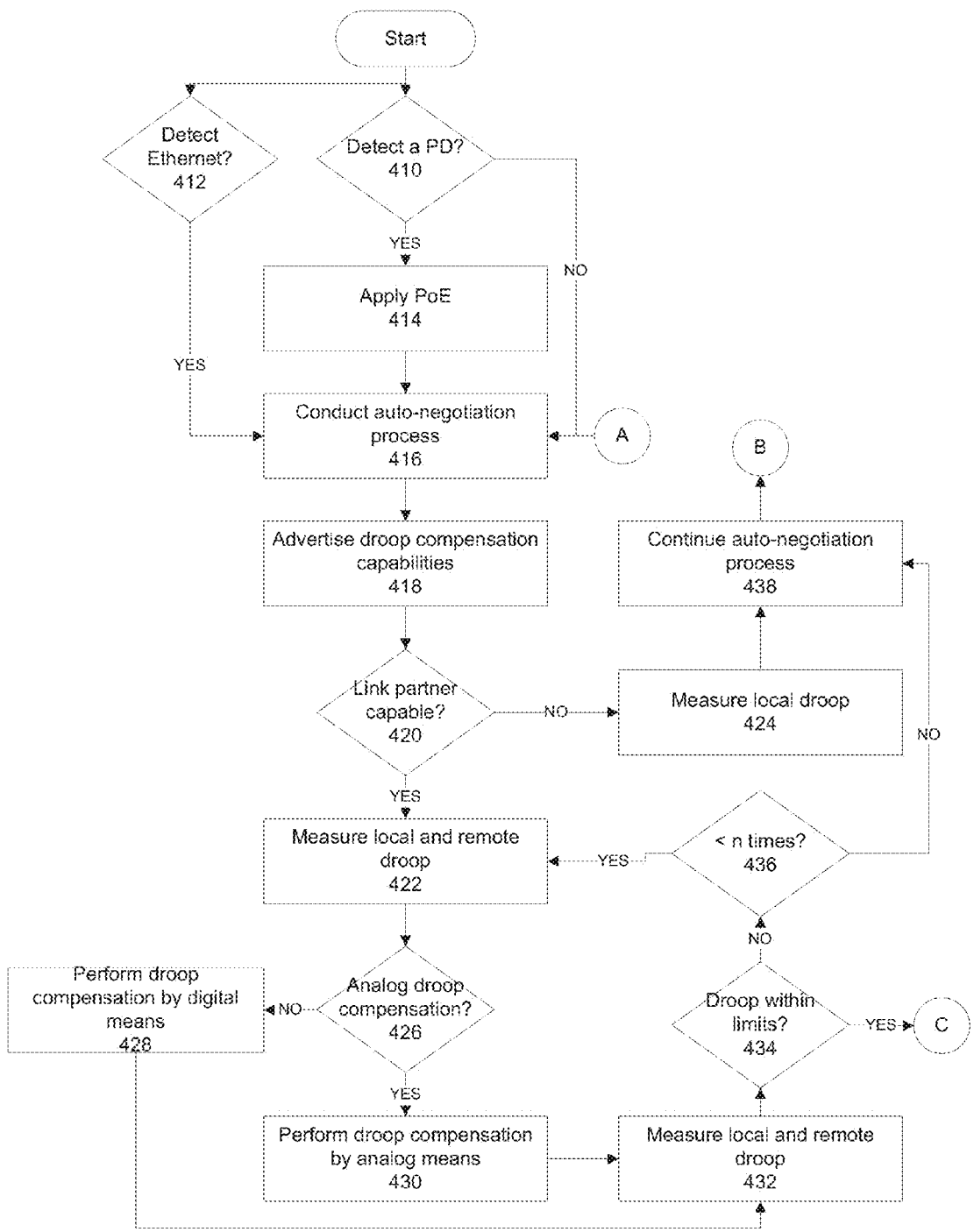
FIGS. 4B and 4C are flow diagrams illustrating example operations for communicating with a link partner according to implementations discussed herein.
Figure 4C:
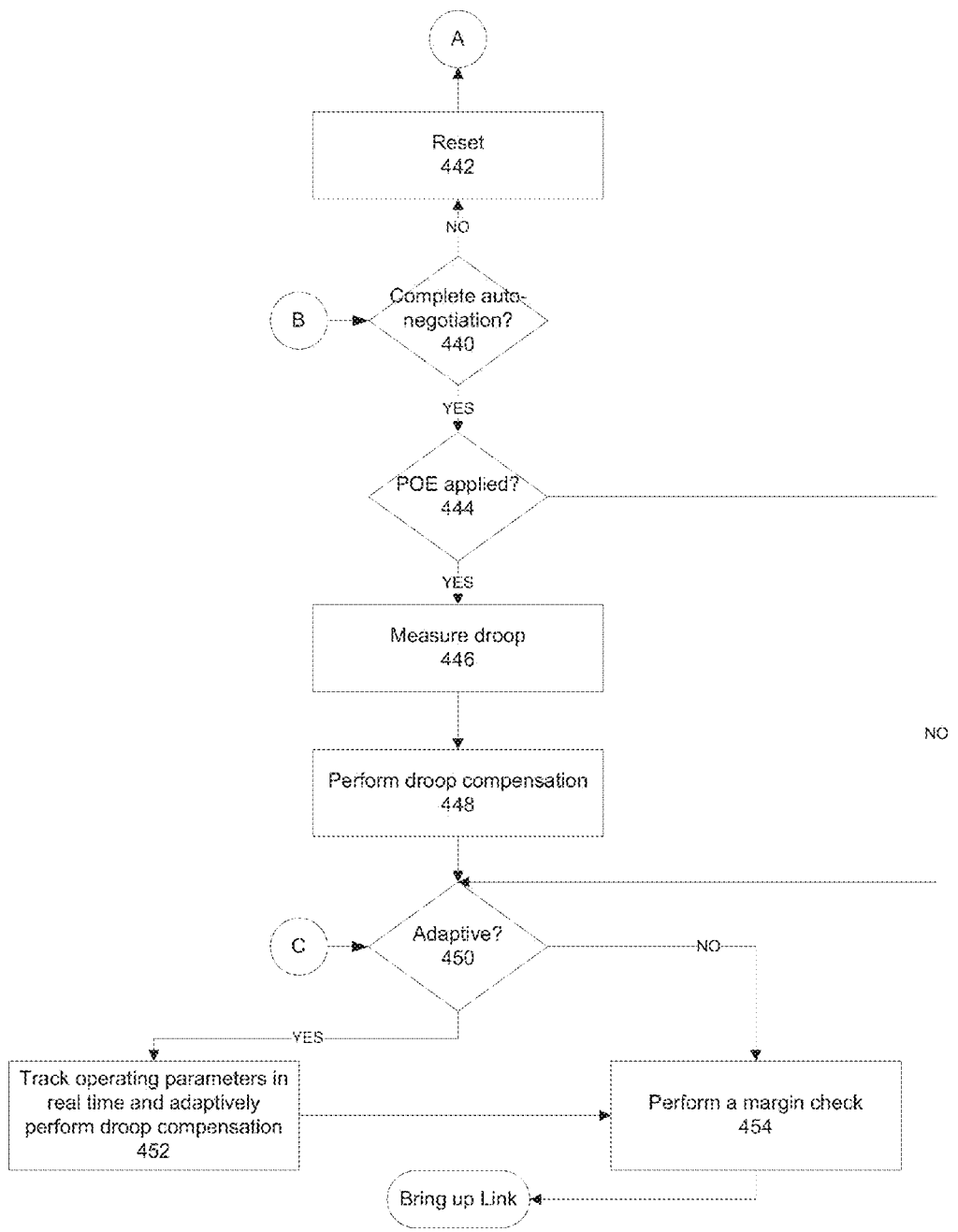

Referring now to FIGS. 4B and 4C, flow diagrams illustrating example operations for communicating with a link partner are shown. For example, the example operations discussed herein allow the link partners (i.e., the devices at opposite ends of the communication link) to exchange information for determining and negotiating which end of the link (e.g., transmit, receive or both) is responsible for performing droop compensation, the mechanism that will be used to perform droop compensation (e.g., analog means, digital means, adaptive correction, static correction, etc.) and the amount of droop compensation. For example, if both ends of the link (e.g., transmit and receive ends) are capable of performing droop compensation, the transmit end and the receive end can measure and exchange operating parameters and negotiate how to perform droop compensation. Alternatively, either the transmit end or the receive end can measure and then exchange operating parameters with the opposite end and negotiate how to perform droop compensation. Because the opposite ends of the link negotiate how to perform droop compensation, it is possible to prevent the opposite ends from working independently and against each other, which can result in under- or over-compensation. In these cases, both transmit and receive ends may be intelligent devices, as discussed above. Additionally, it is possible to facilitate one of the opposite ends making up for the other one of the opposite ends inability to adequately compensate for droop. In this case, one of the ends may be an intelligent device and the other end may be a legacy device, as discussed above.

As shown in FIG. 4B, the operations can start, for example, when the communication link (e.g., an Ethernet cable) is connected between link partners (e.g., network devices, PDs, etc.). At 410, a determination is made as to whether a PD is detected. If YES, the operations continue to 414 where PoE (e.g., a common mode voltage signal) is applied by the PSE device to supply the PD with power, for example, before beginning an auto-negotiation process at 416. If a PD is not detected, the operations continue directly to 416 where an auto-negotiation process begins. In addition, at 412, a determination is made as to whether an Ethernet connection is detected. If YES, the operations continue to 416 where an auto-negotiation process begins.

It should be understood that the auto-negotiation process allows the link partners to negotiate characteristics of the communication link such as link speed, for example (e.g., 100 Mbit/s, 1 Gb/s, 10 Gb/s, etc.). As part of the auto-negotiation process at 418, the link partners can advertise their droop compensation capabilities. The droop compensation capabilities can be exchanged using the Next Page protocol of IEEE 802.3 or any other protocol that allows the link partners to exchange extra information. The droop compensation capabilities can be mechanisms for adjusting at least one of a transmit characteristic or a receive characteristic of the magnetic device. For example, the droop compensation capabilities can include whether the adjustment is static or adaptive, whether transmit, receive or both magnetic devices are responsible for performing droop compensation, and/or whether the droop compensation will be performed by analog or digital means. This disclosure contemplates that the link partners can exchange any information that is useful for determining and negotiating performance of droop compensation. This information can optionally include, but is not limited to, one or more of the plurality of measured operating parameters discussed above. Additionally, by exchanging droop compensation capabilities, the link partners can negotiate an order of performance of at least one of the droop compensation capabilities with the link partner. This disclosure contemplates that negotiating an order of performance includes not performing one or more of the droop compensation capabilities.

Then, at 420, a determination is made as to whether the remote link partner is capable of performing droop compensation. If YES, at 422, the link partners can measure the local and remote droop. It should be understood that the link partners can negotiate the order and method for measuring the local and remote droop. If NO, at 424, the local droop is measured. As discussed above, the measured droop (e.g., local and remote or only local) can be communicated between the link partners. Optionally, the local and/or remote droop can be stored in memory. The link partners can then perform droop compensation. As discussed above, the link partners can negotiate how to perform droop compensation. Droop compensation can therefore be performed at one or both ends of the communication link, for example. At 426, a determination is made as to whether analog droop compensation will be performed. If NO, at 428, droop compensation is performed by any of the digital means discussed above. For example, an adaptive filter of at least one of the transmission or receiver magnetic device can be adjusted accordingly. If YES, at 430, droop compensation is performed by any of the analog means discussed above.

After performing droop compensation, at 432, the link partners can re-measure local and remote droop, and at 434, a determination can be made if the local and/or remote droop is within acceptable limits. If YES, the operations continue to 450 where a determination is made as to whether adaptive droop compensation will be performed. Adaptive droop compensation is discussed below with regard to FIG. 4C. If NO, a determination is made as to whether local and remote droop have been measured a predetermined number of times such as three times, for example, at 436. This disclosure contemplates that the local and remote droop can be measured any number of times and at any interval. The measurement and compensation steps can be repeated to ensure that the operating conditions on the communication link have stabilized over time (i.e., achieved steady state), for example. Thus, if the local and remote droop have been measured fewer than the predetermined number of times, the operations can return to 422. If the local and remote droop have been measured greater than the predetermined number of times, the operations can continue to 438 where the auto-negotiation process continues and adaptive droop compensation continues.

Referring now to FIG. 4C, a determination is made at 440 as to whether the auto-negotiation process is complete. If NO, at 442, the link partner(s) are reset and the operations return to 416 where the auto-negotiation process begins again. If YES, a determination is made at 444 as to whether PoE is applied. If NO, the operations continue to the 450 where a determination is made as to whether adaptive droop compensation will be performed, which is discussed below. If YES, the link partners measure the droop at 446 and perform droop compensation at 448. As discussed above, measuring the droop can include measuring a plurality of operating parameters including at least one operating parameter that has an effect on an OCL of the magnetic device (e.g., an effective current imbalance in the pair of conductors, a temperature, a current of the common mode voltage signal, a pulse power of the common mode voltage signal, etc.). Additionally, the transmit characteristic or the receive characteristic of the magnetic device can be adjusted based on the measured operating parameters.

At 450, a determination is made as to whether adaptive droop compensation will be performed. For example, the transmit characteristic and/or the receive characteristic of the magnetic device can optionally be adaptively adjusted in response to a change in the measured operating parameters. In other words, the transmit characteristic and/or the receive characteristic of the magnetic device can be dynamically updated (i.e., in real time) in response to changing conditions. For example, changing conditions can include, but are not limited to a change in temperature of the magnetic device, a change in PoE current or power, degradation of the communication signals (i.e., data corruption occurs), magnetic drift, etc. If adaptive droop compensation is to be performed, the droop compensation can be continuously adapted or automatically corrected as changing conditions are presented. For example, at 452, operating parameters are tracked (i.e., measured, stored, etc.) in real time and droop compensation is adaptively performed. The operations then proceed to 454 where a margin check is performed (discussed below). If the margin check is performed successfully, the speed and duplex mode can be set and the link can be brought up.

As discussed above, at 454, a margin check can be performed. As shown in FIG. 4C, the margin check can be performed while, or in lieu of, performing adaptive droop compensation at 452. The margin check can include applying a droop to evaluate the compensation that provides a small margin to the specification and detecting (or tracking) errors in the communication signals. Because the methods for performing droop compensation discussed herein are optionally performed when the link is being brought up, the margin check can identify the possibility that droop compensation will be insufficient to prevent errors on the link as operating conditions change.

Figure 4D:
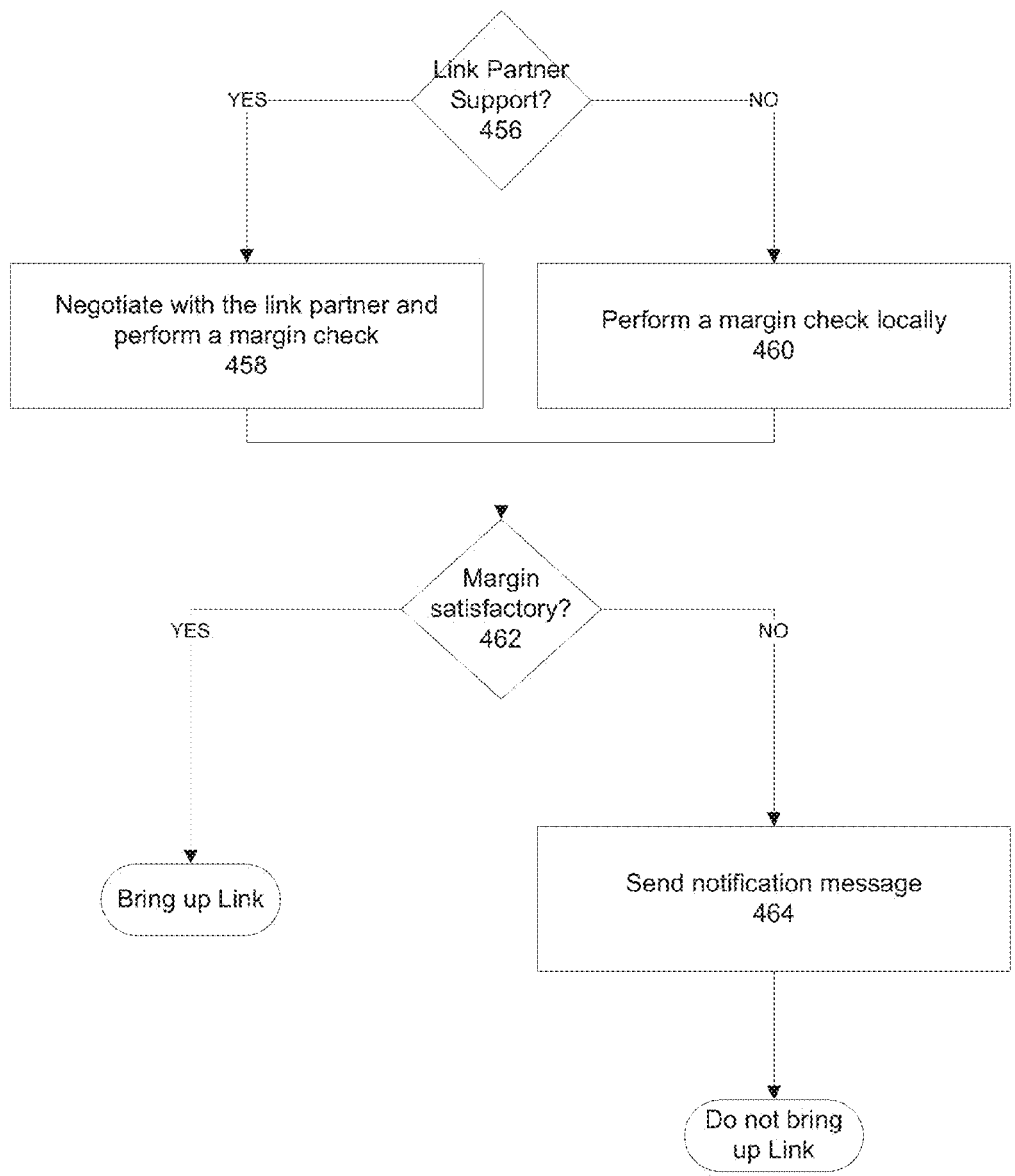
FIG. 4D is a flow diagram illustrating example operations for performing a margin check according to implementations discussed herein.

Referring now to FIG. 4D, a flow diagram illustrating example operations for performing a margin check are shown. At 456, a determination is made as to whether a link partner is capable of performing droop compensation. If YES, at 458, it is possible to negotiate performance of the margin check with the link partner and perform the margin check. For example, droop compensation that provides a small margin to the specification can be applied at one or both ends of the link and communication signals can be drooped purposely. Errors in the communication signals can then be tracked. Alternatively or additionally, one or both ends can send a long pulse (i.e., up to 1 μsec) and droop can be measured. If NO, at 460, it is possible to perform the margin check locally. For example, an intelligent device can execute a droop test and detect errors at its receiver. The intelligent device can communicate with the other end of the link using an echo mechanism or a proprietary communication protocol and measure droop at its receiver. At 462, a determination is made as to whether the margin is satisfactory. Margin can be satisfactory if errors or droop are less than a predetermined rate or amount. If YES, the speed and duplex mode can be set and the link can be brought up. If NO, a notification message can be sent to a user (e.g., a network administrator) at 464. In this case, the link will not be brought up because of the potential that droop compensation will be insufficient to prevent errors on the link as operating conditions change.

Figure 5:
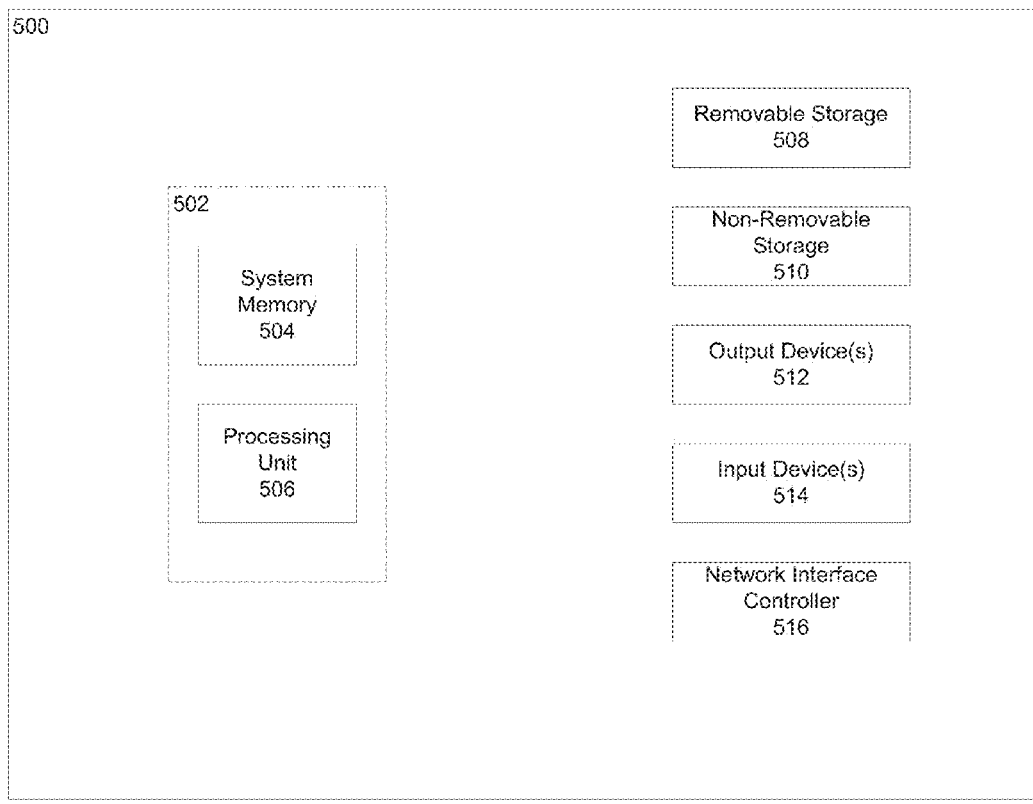
FIG. 5 is a block diagram of an example computing device.

When the logical operations described herein are implemented in software, the process may execute on any type of computing architecture or platform. For example, referring to FIG. 5, an example computing device upon which embodiments of the invention may be implemented is illustrated. For example, the network device, PSE device, PD, etc. discussed above can include one or more features of the computing device 500. Additionally, the transmitter and receiver DSPs can be implemented as a specialized computing device for digital signal processing and can include one or more of the features of the computing device 500. The computing device 500 may include a bus or other communication mechanism for communicating information among various components of the computing device 500. In its most basic configuration, computing device 500 typically includes at least one processing unit 506 and system memory 504. Depending on the exact configuration and type of computing device, system memory 504 may be volatile (such as random access memory (RAM)), non-volatile (such as read-only memory (ROM), flash memory, etc.), or some combination of the two. This most basic configuration is illustrated in FIG. 5 by dashed line 502. The processing unit 506 may be a standard programmable processor that performs arithmetic and logic operations necessary for operation of the computing device 500. Alternatively or additionally, the computing device 500 can include one or more PHY devices (e.g., PHY device 302 discussed above) where each PHY device includes at least one processor and memory. The one or more PHY devices can be configured to interface with one or more processors and memory, which are shared among the one or more PHY devices, for example.

Computing device 500 may have additional features/functionality. For example, computing device 500 may include additional storage such as removable storage 508 and non-removable storage 510 including, but not limited to, magnetic or optical disks or tapes. Computing device 500 may also contain network connection(s) 516 that allow the device to communicate with other devices. Computing device 500 may also have input device(s) 514 such as a keyboard, mouse, touch screen, etc. Output device(s) 512 such as a display, speakers, printer, etc. may also be included. The additional devices may be connected to the bus in order to facilitate communication of data among the components of the computing device 500. All these devices are well known in the art and need not be discussed at length here.

The processing unit 506 may be configured to execute program code encoded in tangible, computer-readable media. Computer-readable media refers to any media that is capable of providing data that causes the computing device 500 (i.e., a machine) to operate in a particular fashion. Various computer-readable media may be utilized to provide instructions to the processing unit 506 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 506 may execute program code stored in the system memory 504. For example, the bus may carry data to the system memory 504, from which the processing unit 506 receives and executes instructions. The data received by the system memory 504 may optionally be stored on the removable storage 508 or the non-removable storage 510 before or after execution by the processing unit 506.

Computing device 500 typically includes a variety of computer-readable media. Computer-readable media can be any available media that can be accessed by device 500 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program (s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for performing droop compensation in a network device, the network device comprising a magnetic device and an interface for receiving a pair of conductors, the magnetic device having a primary winding and a secondary winding, the pair of conductors being coupled to the secondary winding of the magnetic device and being configured to carry a communication signal, the method comprising:
measuring a plurality of operating parameters, wherein the plurality of operating parameters include at least one operating parameter that has an effect on an open circuit inductance (OCL) of the magnetic device;
receiving information advertised by a link partner network device to determine the link partner network device's droop compensation capability, wherein the link partner network device is communicatively connected to the network device over the pair of conductors;
transmitting the measured operating parameters to the link partner network device;
negotiating performance of droop compensation with the link partner network device, wherein the negotiation comprises determining the network device's responsibility during performance of droop compensation based on the measured operating parameters and the link partner network device's droop compensation capability; and
in response to the negotiation, adjusting at least one of a transmit characteristic or a receive characteristic of the magnetic device.

2. The method of claim 1, wherein determining the link partner network device's droop compensation capability further comprises determining whether the link partner network device is capable of adjusting at least one of a transmit characteristic or a receive characteristic of the magnetic device.

3. The method of claim 1, wherein the plurality of operating parameters include an effective current imbalance in the pair of conductors.

4. The method of claim 1, wherein the pair of conductors is further configured to carry a common mode voltage signal.

5. The method of claim 1, wherein the plurality of operating parameters further include at least one of a temperature, a current of a common mode voltage signal or a pulse power of a common mode voltage signal.

6. The method of claim 1, wherein adjusting at least one of a transmit characteristic or a receive characteristic of the magnetic device further comprises injecting a direct current bias to the magnetic device to compensate for a change in the measured operating parameters.

7. The method of claim 1, wherein adjusting at least one of a transmit characteristic or a receive characteristic of the magnetic device further comprises adjusting the transmit characteristic by applying a pre-distorted communication signal to the primary winding of the magnetic device, wherein a pre-distortion characteristic of the pre-distorted communication signal compensates for a change in the measured operating parameters.

8. The method of claim 1, wherein adjusting at least one of a transmit characteristic or a receive characteristic of the magnetic device further comprises adjusting an adaptive filter to compensate for a change in the measured operating parameters.

9. The method of claim 1, wherein adjusting at least one of a transmit characteristic or a receive characteristic of the magnetic device further comprises selecting at least one of a predetermined transmit or receive characteristic of the magnetic device based on the measured operating parameters.

10. The method of claim 1, further comprising adaptively adjusting at least one of a transmit characteristic or a receive characteristic of the magnetic device in response to a change in the measured operating parameters.

11. The method of claim 1, further comprising:
establishing a communication link with the link partner network device; and
exchanging information comprising droop compensation capabilities during an auto-negotiation process with the link partner network device, wherein the droop compensation capabilities comprise mechanisms for adjusting at least one of a transmit characteristic or a receive characteristic of the magnetic device.

12. The method of claim 1, wherein adjusting at least one of a transmit characteristic or a receive characteristic of the magnetic device assists the link partner network device, the link partner network device being incapable of performing sufficient droop compensation.

13. The method of claim 1, further comprising performing a droop compensation margin check.

14. A network device, comprising:
a magnetic device having a primary winding and a secondary winding;
an interface for receiving a pair of conductors, the pair of conductors being coupled to the secondary winding of the magnetic device and being configured to carry a communication signal;
a sensing circuit configured to measure a plurality of operating parameters, wherein the plurality of operating parameters include at least one operating parameter that has an effect on an open circuit inductance (OCL) of the magnetic device; and
a circuit configured to:
receive information advertised by a link partner network device to determine the link partner network device's droop compensation capability, wherein the link partner network device is communicatively connected to the network device over the pair of conductors,
transmit the measured operating parameters to the link partner network device,
negotiate performance of droop compensation with the link partner network device, wherein the negotiation comprises determining the network device's responsibility during performance of droop compensation based on the measured operating parameters and the link partner network device's droop compensation capability, and
in response to the negotiation, adjust a transmit characteristic of the magnetic device.

15. The network device of claim 14, wherein the circuit is further configured to determine the link partner network device's droop compensation capability by determining whether the link partner network device is capable of adjusting at least one of a transmit characteristic or a receive characteristic of the magnetic device.

16. The network device of claim 14, wherein the plurality of operating parameters include an effective current imbalance in the pair of conductors.

17. The network device of claim 14, wherein the pair of conductors is further configured to carry a common mode voltage signal.

18. The network device of claim 14, wherein the plurality of operating parameters further include at least one of a temperature, a current of a common mode voltage signal or a pulse power of a common mode voltage signal.

19. A physical layer device (PHY), comprising:
a transmitter section comprising:
  a transmitter digital signal processor (DSP); and
  a transmitter digital-to-analog converter (DAC) communicatively connected between the transmitter DSP and a transmission magnetic device having primary and secondary windings, the transmitter DAC being communicatively connected to the primary winding of the transmission magnetic device via a pair of transmitter conductors;
a receiver section comprising:
  a receiver DSP; and
  a receiver analog-to-digital (ADC) communicatively connected between the receiver DSP and a receiver magnetic device having primary and secondary windings, the receiver ADC being communicatively connected to the primary winding of the receiver magnetic device via a pair of receiver conductors; and
a memory, wherein the pairs of transmitter and receiver conductors are configured to carry a communication signal, and wherein at least one of the transmitter section or the receiver section is configured to:
  receive a plurality of measured operating parameters, wherein the plurality of measured operating parameters include at least one measured operating parameter has an effect on an open circuit inductance (OCL) of the transmitter or receiver magnetic device;
  receive information advertised by a link partner network device to determine the link partner network device's droop compensation capability, wherein the link partner network device is communicatively connected to the network device;
  transmit the measured operating parameters to the link partner network device;
  negotiate performance of droop compensation with the link partner network device, wherein the negotiation comprises determining a network device's responsibility during performance of droop compensation based on the measured operating parameters and the link partner network device's droop compensation capability;
  update the memory with the plurality of measured operating parameters and the link partner network device's droop compensation capability; and
  in response to the negotiation, adjust at least one of a transmit characteristic of the transmission magnetic device or a receive characteristic of the receiver magnetic device.

20. The PHY of claim 19, wherein at least one of the transmitter section or the receiver section is further configured to determine the link partner network device's droop compensation capability by determining whether the link partner network device is capable of adjusting at least one of a transmit characteristic or a receive characteristic of a magnetic device.

* * * * *